(12) United States Patent
Pye

(10) Patent No.: US 8,757,234 B2
(45) Date of Patent: Jun. 24, 2014

(54) TAPE APPLICATOR

(75) Inventor: Warrick Keith Pye, St George (AU)

(73) Assignee: Maree Gaye Miller, Beachmere (AU)

( * ) Notice: Subject to any disclaimer, the term of this patent is extended or adjusted under 35 U.S.C. 154(b) by 884 days.

(21) Appl. No.: 10/569,751

(22) PCT Filed: Aug. 25, 2004

(86) PCT No.: PCT/AU2004/001140
§ 371 (c)(1),
(2), (4) Date: Oct. 13, 2006

(87) PCT Pub. No.: WO2005/019080
PCT Pub. Date: Mar. 3, 2005

(65) Prior Publication Data
US 2007/0158028 A1    Jul. 12, 2007

(30) Foreign Application Priority Data
Aug. 25, 2003  (AU) ................................ 2003904537

(51) Int. Cl.
*B29C 65/00* (2006.01)
*B32B 37/00* (2006.01)
*B31F 1/00* (2006.01)

(52) U.S. Cl.
USPC .......... 156/543; 156/494; 156/555; 156/582; 156/459

(58) Field of Classification Search
USPC ............. 156/494, 459, 582, 583.91, 555, 576
See application file for complete search history.

(56) References Cited

U.S. PATENT DOCUMENTS

| | | | | | |
|---|---|---|---|---|---|
| 2,141,652 | A | * | 12/1938 | Holmes | 139/304 |
| 2,374,504 | A | * | 4/1945 | Salfisberg | 53/554 |
| 3,027,285 | A | * | 3/1962 | Eisner et al. | 156/359 |
| 3,737,359 | A | * | 6/1973 | Levitan | 156/522 |
| 4,534,498 | A | * | 8/1985 | Nilsson | 226/181 |
| 5,810,965 | A | * | 9/1998 | Fwu | 156/359 |

FOREIGN PATENT DOCUMENTS

| | | |
|---|---|---|
| EP | 363691 | 5/1994 |
| GB | 865400 | 4/1961 |
| GB | 883514 | 11/1961 |
| GB | 2099393 | 12/1982 |

OTHER PUBLICATIONS

International Search Report; PCT/AU2004/001140; Oct. 15, 2004.

\* cited by examiner

*Primary Examiner* — Philip Tucker
*Assistant Examiner* — Alex Efta
(74) *Attorney, Agent, or Firm* — Hoffmann & Baron, LLP

(57) ABSTRACT

A tape applicator (51) for applying tape to a substrate, the tape applicator comprising a pair of nip rollers wherein the nip rollers comprise a tape roller (55) and a substrate roller (56), the tape applicator further comprising a tension roller (57) disposed in front of the substrate roller (56) to tension the substrate prior to feeding between the nip rollers, a tape feed and a drive for rotating the nip rollers.

11 Claims, 6 Drawing Sheets

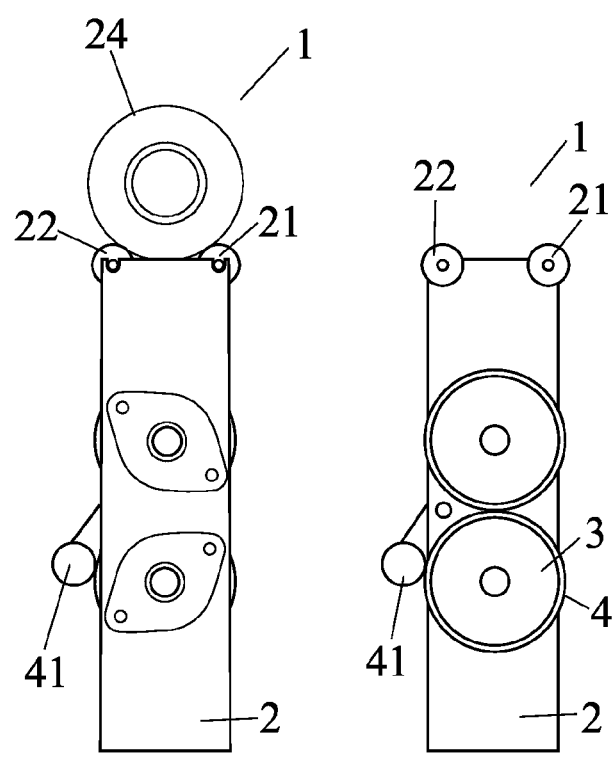
FIG. 2  FIG. 3

TAPE APPLICATOR

FIELD OF THE INVENTION

The present invention relates to the application of tape to a substrate and has particularly use in the signwriting industry. In particular the present invention relates to a tape applicator for use in applying tape to signwriting vinyls.

Whilst the present invention will be described specifically with reference to signwriting vinyls, it will be understood that the tape applicator of the present invention may have other applications where a tape needs to be applied to a substrate.

BACKGROUND ART

Signwriting vinyls are used in the manufacture of signs and our widely used in the signwriting industry. The vinyls are applied to substrates to form signs. The vinyls are typically applied to a substrate with an adhesive. Generally the vinyl is supplied to the signwriter in rolls with the adhesive already applied to the vinyl. A backing sheet protects the adhesive and prevents the roll of vinyl sticking to itself.

In the preparation of signs, the vinyls are attached to an application tape that is removably attached to the front face of the vinyl. The application tape allows the vinyls to be attached to a substrate whilst the front face of the vinyl is protected by the application tape. Further, in applying vinyls formed into complex shapes to a substrate in the application tape assists in preventing creasing or other damage to the vinyl resulting from the vinyl sticking to itself.

Application tape is generally applied manually to a vinyl in a process that often requires two operators, one to manipulate the vinyl and the other two manipulate the application tape. As the application tape includes a removable adhesive it can be cumbersome to handle in that it also tends to stick to itself. This process can be particularly persnickety with the large signs formed from large vinyl panels and the application of tape to a vinyl panel may require two or more persons. Signs prepared on-site often require the application tape to be applied in exposed locations where environmental conditions such as wind can make the manipulation of the application tape more difficult.

We have now found a tape applicator that allows tape to be applied to a substrate in a manner that overcomes or ameliorates one or more of the disadvantages described above, or at least provides the consumer with a useful or commercial choice.

SUMMARY OF THE INVENTION

In one broad form, the present invention provides a tape applicator for applying tape to a substrate, the tape applicator comprising a pair of nip rollers wherein the nip rollers comprise a tape roller and a substrate roller, the tape applicator further comprising a tension roller of a substantially same length as the substrate roller and disposed in front of the substrate roller to tension the substrate evenly across the width of the substrate, the tension roller being mounted on arms rotatably mounted to a frame such that the tension roller may be rotated between an operational condition in which the weight of the tension roller urges the substrate into contact with the substrate roller and a passive condition in which the tension roller is swivelled out from the substrate roller, wherein the longitudinal axis of the tension roller is parallel to a longitudinal axis of the substrate roller in both the operational condition and the passive condition, and a weight of the tension roller urging the substrate into contact with the substrate roller prior to feeding between the nip rollers, a tape feed, and a drive for rotating the nip rollers.

Advantageously, the tape applicator of the present invention allows a tape to be applied to a substrate in a manner that is even and minimises entrapped air and/or creases in either the tape or the substrate by a single operator. The tape may be initially fed through the nip rollers and the leading edge of the substrate engaged in the nip rollers such that by driving of the nip rollers the substrate is feed through the nip rollers and the tape applied thereto.

The nip rollers preferably have a rubberised surface that provides good traction between the rollers and the respective tape and substrate. The nip rollers may be formed with a shaft upon which is disposed a thick rubberised collar or alternatively a cylindrical roller may be used with a thin rubberised sleeve.

The pair of nip rollers are preferably mounted for rotation on a frame. One or both of the nip rollers may be driven by the drive. It is preferred that the nip rollers are mounted on suitable bearings.

The pair of nip rollers includes a tape roller and a substrate roller. The tape roller is the roller against which the tape is borne as it is the fed through the nip rollers. The substrate roller is the roller against which the substrate is borne as it is fed through the nip rollers.

The pair of nip rollers may be spaced apart and rotatably mounted on a frame in a fixed or adjustable position. Where the thickness of the substrate and tape are constant then the rollers may be positioned in a preset spacing for application of the tape to the substrate. It is preferred that the nip rollers are mounted on a frame whereby the spacing between the nip rollers may be varied in use. It is also preferred that the nip rollers are biased to a closed position whereby there is little or minimal spacing between the rollers. As the substrate and tape are fed between the pair of nip rollers the nip rollers may be urged apart yet still provide the desired pressure upon the substrate and tape for affixing the tape to the substrate.

In one embodiment, with the nip rollers may be biased to a closed position using a spring attached to each end of one or both of the nip rollers and to the frame. The spring or springs may be also attached between the nip rollers.

The tension roller is disposed in front of the substrate roller to tension the substrate prior to feeding between the nip rollers. In one configuration, the tension roller may be biased against the substrate roller such that the substrate is pressed and held against the substrate roller before it engages the nip. For the ease of locating the substrate between the nip rollers, it is preferred that the tension roller can be moved from an operative condition to a feed condition. In the operative condition the be tension roller presses the substrate against the substrate roller. In the feed condition the tension roller is positioned away from the substrate roller such that the substrate can be really fed to the nip of the nip rollers. Preferably the tension roller is biased to the operative condition. The tension roller may preferably be biased to the operative condition by mounting the tension roller on arms rotatably mounted on the frame whereby the weight of the tension roller urges the substrate into contact with the substrate roller. The tension roller may be held away from the substrate roller in the feed condition by an over centre mechanism or may be held away from the substrate roller using a latch member or the like. A handle may be provided on the tension roller or its associated mechanism to allow the operator to manipulate the tension roller between the operative condition and the feed condition.

The tape applicator includes a tape feed. It will be apparent to those skilled in the art that a variety of tape feeds may be employed in the tape applicator of the present invention. In a preferred configurations, the substrate roller is disposed below the tape roller and a tape feed is provided immediately above the tape roller. In this configuration, a convenient and preferred tape feed includes a pair of freely rotating spaced apart rollers upon which is supported a roll of tape that can be freely fed between the pair of nip rollers as the nip rollers rotate.

A drive mechanism for rotating the nip rollers is also provided in the tape applicator. The drive may be an automated electrical or mechanical drive or may be a manually operated drive. In one embodiment of the present invention a simple mechanical, hand operated drive is provided in the form of a handle affixed to one of the pair of nip rollers. The handle may be affixed directly to one of the nip rollers or may be geared and to provide the desired gearing ratio. Alternatively, an automated drive may be provided by way of either a mechanical drive or an electrical drive for one of the nip rollers.

The tape applicator of the present invention is preferably mounted on a frame that is readily portable and can be moved from site to site. Preferably the frame includes mountings that allow it to be removably mounted to a suitable workbench or the like.

Vinyls are typically from 50 mm to 1.3 mm in width. It is preferred that the tape applicator of the present invention be able to accommodate a wide variety of vinyls or other substrates. Vinyls suitable for use in the tape application of the present invention include reflective, metallic, opaque grades of vinyls. In one preferred configurations the tape applicator will include nip rollers approximately 650 mm in width. In another embodiment of the tape applicator will include nip rollers approximately 1.3 m in width.

Other materials that may be processed using the tape applicator of the present invention include corflute, Weathertex™ (a reconstituted timber panel), and glass.

Advantageously, the tape applicator of the present invention allows two-person jobs to be efficiently and professionally completed by a single person. The tape applicator may also reduce material wastage as the damage to both the application tape and the substrate, such as by creasing, tearing on the entrapment of air bubbles, may be minimised by the efficient and professionally use of the tape applicator. The presence of air bubbles caused by uneven application. this will then be transferred through to the vinyl when the backing is removed, producing a poor final result. We have found that the tape applicator of the present invention may also provide a better tape finish on the substrate, that is when peeling the backing from the substrate.

The transportability of the tape applicator of the present invention allows for the taking of vinyls on-site and even in windy conditions.

A manually operated tape applicator according to one of the embodiments of the present invention provides a tape applicator that requires little or minimal maintenance and is particularly cost-effective.

The tape applicator of the present invention reduces the need to clear work from benches or even join benches to create bench space, especially if the job that has to be taped, is a large one, either in length or in width. The tape applicator of the present invention requires a smaller work area than tape application processes currently employed.

In order that the invention may be more fully understood and put into practice, preferred embodiments thereof will now be described with reference to the accompanying drawings.

BRIEF DESCRIPTION OF THE DRAWINGS

FIG. 2 is a side view of the tape applicator shown in FIG. 1.

FIG. 3 is a cross-sectional view of the tape applicator shown in FIG. 1.

FIGS. 1, 2 and 3 shows a tape applicator 1 having a frame assembly 2. A substrate roller 3 is rotatably mounted on the frame assembly 2. The substrate roller 3 includes a rubber sleeve 4. The substrate roller 3 is mounted on the frame assembly 2 by bearings 7 and 8. Bearings 7 and 8 are bolted to the frame assembly 2 with bolts 11 and 12 and 13 and 14 respectively. The tape applicator 1 has a tape roller 5 with a rubber sleeve 6. The tape roller 5 is rotatably mounted on the frame assembly 2 with bearings 9 and 10. Bearings 9 and 10 are mounted on the frame assembly with bolts 15 and 16 and 17 and 18 respectively. Bolts 15 and 17 are tightened to allow the bearings 9 and 10 to be moved relative to the frame assembly. Bearings 16 and 18 pass through an elongated slot (shown in FIG. 4) in the frame assembly 2 such that the tape roller 5 can move relatively to the substrate roller 3 thereby controlling the gap therebetween. Springs 19 and 20 bias the tape roller to abut the substrate roller.

A pair of tape support rollers 21 and 22 are freely rotatably mounted on the frame assembly 2. A handle 23 is attached to the substrate roller 3 directly so as to enable the substrate roller 3 to be rotated by handle 23.

Figure 1:
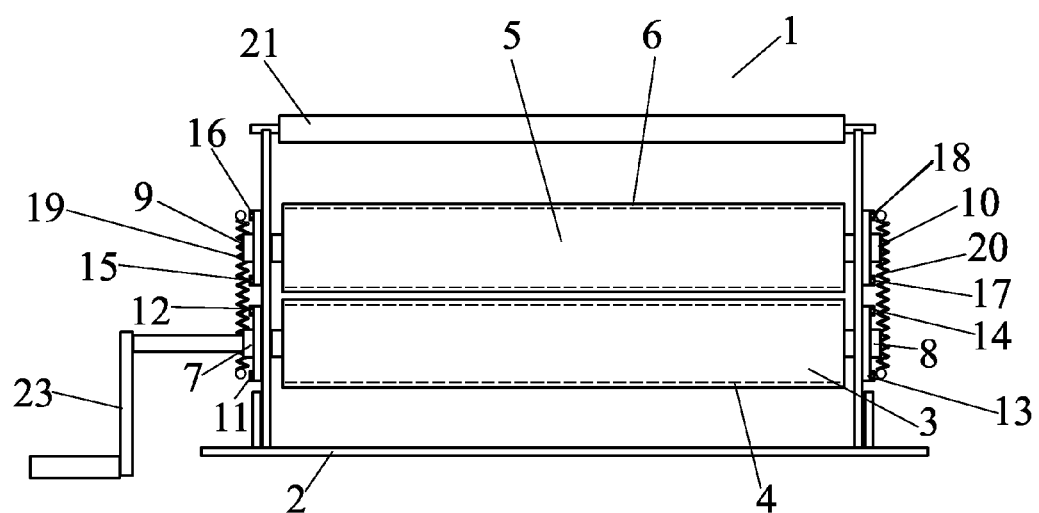
FIG. 1 is front view of a tape applicator according to one embodiment of the present invention.
Figure 4:
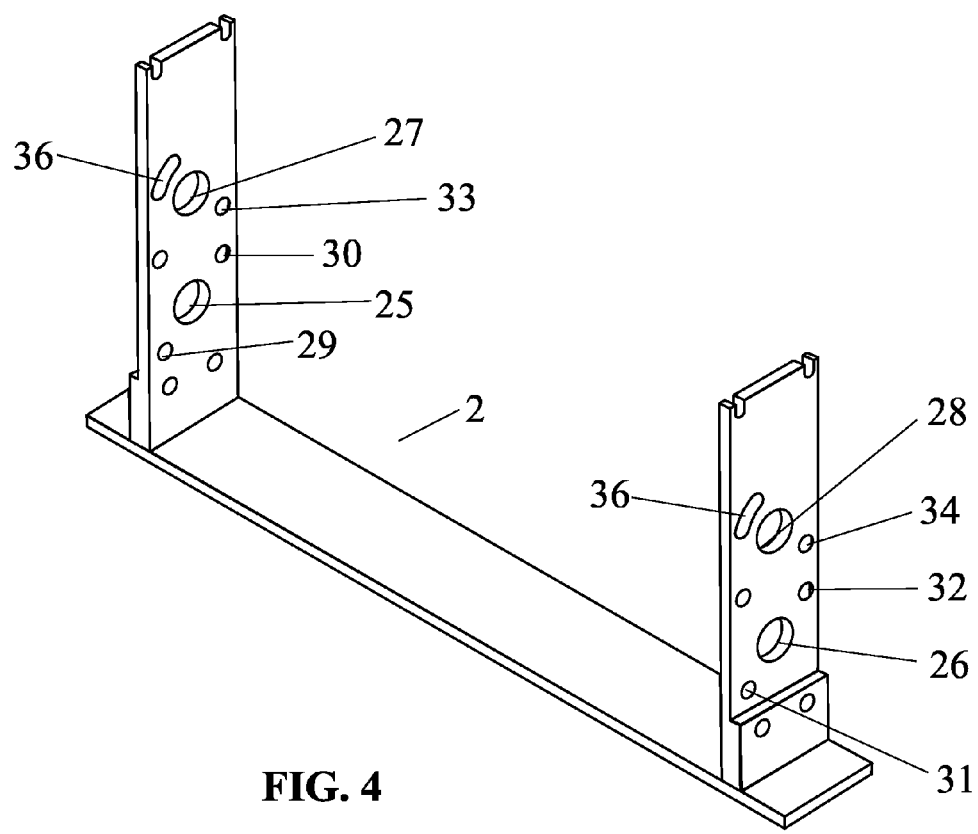
FIG. 4 shows the frame of the tape applicator shown in FIG. 1.

FIG. 4 shows the frame assembly 2 has bores 25 and 26 for receiving the substrate roller 3 bolt holes 29, 30 and 32 allow the respective bearings 7 and 8 to be bolted to the frame assembly 2 with bolts 11, 12, 13 and 14. The tape roller 5 passes through bores 27 and 28 and the bearings 9 and 10 are engaged with the frame assembly 2 with bolts 15 and 17 that pass through bolt holes 33 and 34. Bolt slots 35 and 36 allow movement of the bolts 16 and 18 relative to the frame assembly 2 and allow the bearing 9 and 10 to move against frame assembly 2.

FIGS. 2 and 3 show the tension roller 41 in the operative condition against the substrate roller 3. In FIG. 2 a roller of tape 24 can be seen resting on feed rollers 21 and 22.

Figure 5:
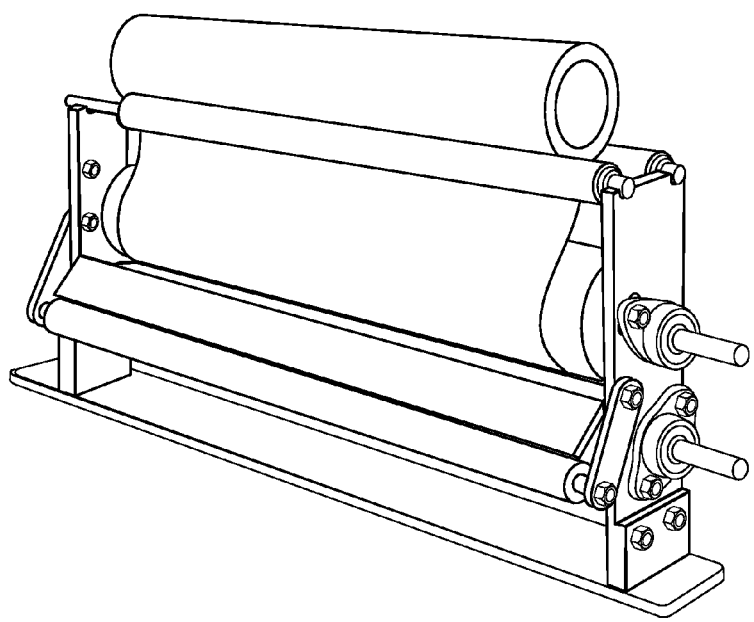
FIG. 5 is a perspective view of the tape applicator shown in FIG. 1 with the tension roller in the operative condition.
Figure 6:
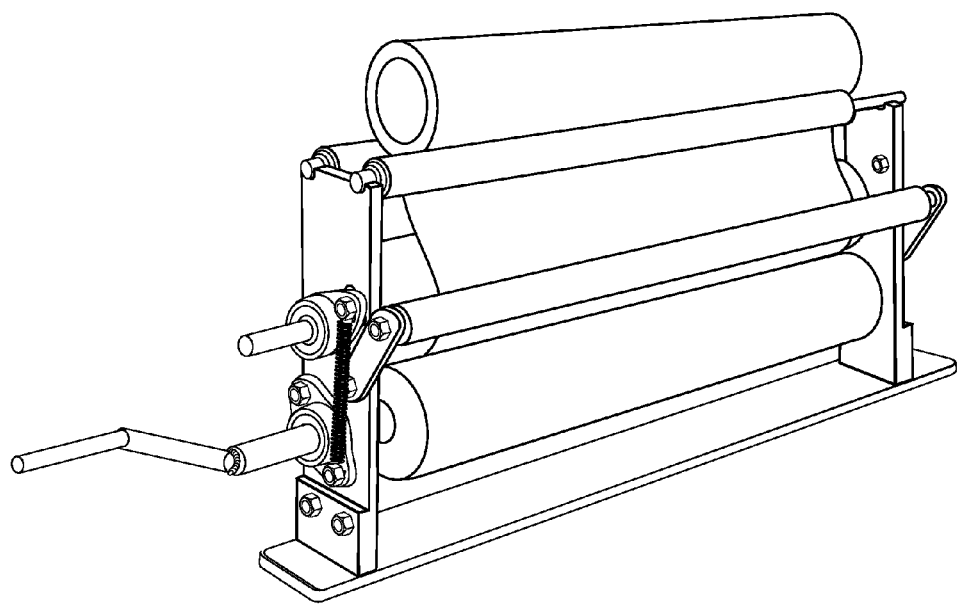
FIG. 6 is a perspective view of the tape applicator shown in FIG. 5 with the tension roller in the feed condition.

FIGS. 5 and 6 are digital photographs that show the prototype manufactured according to the plans shown in FIGS. 1 to 4.

Figure 7:
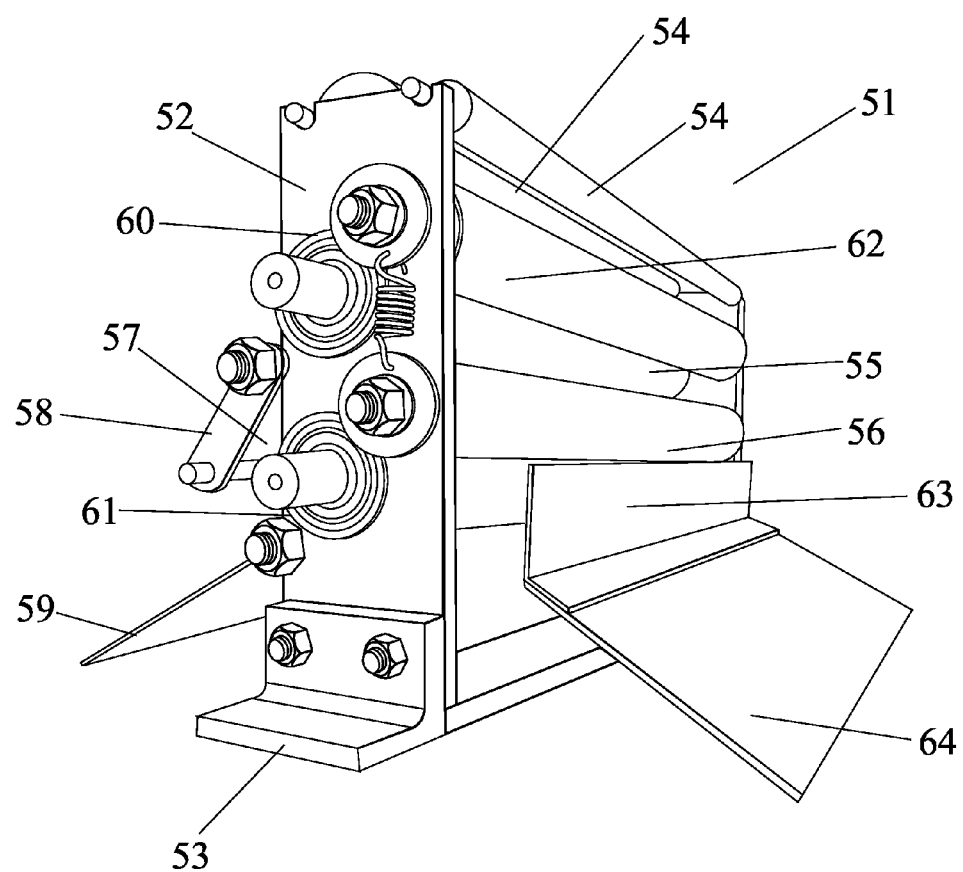
FIG. 7 is a perspective view of a tape applicator according to a second embodiment of the present invention.

The tape applicator 51 shown in FIG. 7 includes a frame 52 having a bracket 53 so that the tape applicator 51 can be readily mounted on a platform bracket not shown.

The tape applicator 51 includes a pair of support rollers 54 for supporting a roll of tape (not shown) such that the tape may be unrolled and fed between the nip rollers 55 and 56. The tape is fed over the tape roller 55 and between the nip created by the tape roller 55 and the substrate roller 56.

The substrate can be fed into the nip between the tape roller 55 and the substrate roller 56 by raising the tension roller 57 by rotating the tension roller support arm about its mount on the tape applicator 51. A ramp 59 is provided on the front of the tape applicator 51 to assist in guiding the substrate.

The nip rollers (being the tape roller 55 and the substrate roller 56) are mounted for rotation on the frame 52. The mounts include respective collars 60 and 61. The collars 60 and 61 are attached to each other by a spring 62. The spring 62 urges the nip rollers together and also positions and tensions the tension roller 57.

In the operative condition the tension roller bears on the substrate and urges it into contact with the substrate roller 56 as the tape and the substrate are fed between the nip rollers the tape is able to be consistently applied to the substrate in a manner that is crease, tear and bubble free.

Once the tape has been applied to the substrate and the tape substrate is fed from between the nip rollers a cutting guide 63 enables the tape substrate to be readily and accurately severed. The cutting guide 63 is mounted on an exit ramp 64.

Persons skilled in the art will appreciate that the invention described above may be subject to improvements and modifications that will be apparent without departing from the spirit and scope of the invention described herein.

The invention claimed is:

1. A tape applicator for applying tape to a substrate, the tape applicator comprising a pair of nip rollers wherein the nip rollers comprise a tape roller and a substrate roller defining a nip therebetween, the tape applicator further comprising a tension roller of a substantially same length as the substrate roller and disposed in front of the substrate roller to tension the substrate evenly across a width of the substrate, the tension roller being mounted on arms rotatably mounted to a frame such that the tension roller being rotatable between an operational condition in which the weight of the tension roller urges the substrate into contact with the substrate roller and a passive condition in which the tension roller is positioned away from the substrate roller, wherein the longitudinal axis of the tension roller is parallel to a longitudinal axis of the substrate roller in both the operational condition and the passive condition, the tension roller being located below the nip in the operational condition so as to direct the substrate at a rising angle into contact with the substrate roller prior to feeding between the nip rollers, a tape feed assembly mounted above the tape roller to support a roll of tape above the tape roller with an axis of rotation of the roll of tape substantially co-planar with at least the tape roller, the tape fed over the tape roller and between the nip rollers to allow the tape roller to tension the tape, and a drive for rotating the nip rollers.

2. A tape applicator according to claim 1 wherein the nip rollers include a rubberised outer sleeve.

3. A tape applicator according to claim 1 wherein the nip rollers may be displaced relative to each other whereby the size of the nip may be varied and wherein said nip rollers are biased to a closed position whereby there is little or no minimal spacing between the rollers.

4. A tape applicator according to claim 3 wherein the nip rollers are biased to the closed position by a spring.

5. A tape applicator according to clam 3 wherein the nip rollers are biased to the closed position by a pair of springs wherein each spring is attached to the respective ends of the nip rollers.

6. A tape applicator according to claim 1 wherein the tension roller is biased against the substrate roller whereby the substrate is pressed and held against the substrate roller before it engages the nip.

7. A tape applicator according to claim 1 wherein the tape feed assembly includes a pair of spaced apart rollers for supporting the roll of tape wherein said pair of spaced apart rollers are disposed above the tape roller.

8. A tape applicator according to claim 1 wherein the drive includes a manually operable handle extending from one of the nip rollers.

9. A tape applicator according to claim 1 wherein the drive includes a motorised drive for rotating one of said nip rollers.

10. A tape applicator according to claim 1 wherein the axis of rotation of the roll of tape is substantially co-planar with the tape roller and the substrate roller.

11. A tape applicator according to claim 10 wherein the axis of rotation of the roll of tape, the tape roller and the substrate roller are in a substantially vertical plane.

\* \* \* \* \*